(12) United States Patent
Xu

(10) Patent No.: US 7,874,512 B2
(45) Date of Patent: Jan. 25, 2011

(54) SYSTEM AND METHOD FOR A FLYABLE AND ROADABLE VEHICLE

(76) Inventor: Junfeng Xu, 1080 Tanland Dr., #203, Palo Alto, CA (US) 94303

( * ) Notice: Subject to any disclaimer, the term of this patent is extended or adjusted under 35 U.S.C. 154(b) by 129 days.

(21) Appl. No.: 11/674,852

(22) Filed: Feb. 14, 2007

(65) Prior Publication Data
US 2008/0011897 A1 Jan. 17, 2008

Related U.S. Application Data

(60) Provisional application No. 60/832,335, filed on Jul. 22, 2006, provisional application No. 60/830,650, filed on Jul. 12, 2006.

(51) Int. Cl.
*B64C 37/02* (2006.01)
*B64D 5/00* (2006.01)

(52) U.S. Cl. .............................. 244/2; 244/49
(58) Field of Classification Search .............. 244/2, 244/49
See application file for complete search history.

(56) References Cited

U.S. PATENT DOCUMENTS

| | | | | |
|---|---|---|---|---|
| 1,316,277 A | * | 9/1919 | Curtiss | 244/2 |
| 2,308,764 A | * | 1/1943 | Makaroff | 244/2 |
| 2,427,936 A | * | 9/1947 | Wales, Jr | 416/115 |
| 2,940,688 A | * | 6/1960 | Bland | 244/2 |
| 3,134,560 A | * | 5/1964 | Halsmer | 244/2 |
| 3,261,572 A | * | 7/1966 | Gorton | 244/2 |
| 4,237,811 A | * | 12/1980 | Montez | 114/273 |
| 4,856,732 A | * | 8/1989 | Eickmann | 244/2 |
| 4,986,493 A | * | 1/1991 | Sarh | 244/2 |
| 5,836,541 A | | 11/1998 | Pham | |
| 5,984,228 A | | 11/1999 | Pham | |
| 6,082,665 A | | 7/2000 | Spitzer | |

(Continued)

FOREIGN PATENT DOCUMENTS

CN 2659719 Y 12/2004

OTHER PUBLICATIONS

International Search Report and The Written Opinion corresponding to the PCT application No. PCT/US07/70139, date of mailing Aug. 4, 2008, 6 pages total.

(Continued)

*Primary Examiner*—Timothy D Collins
*Assistant Examiner*—Valentina Xavier
(74) *Attorney, Agent, or Firm*—Townsend and Townsend and Crew LLP

(57) ABSTRACT

System and method for a flyable and roadable vehicle. According to an embodiment, the present invention provides a vehicle capable of air and road travel. The vehicle is adaptable to a flying configuration and a road configuration. The vehicle includes a fuselage having a front end, a rear end, a top side, a bottom side. The vehicle also includes a wing component having a plurality of planes. The plurality of planes includes a first plane and a second plane. The vehicle additionally includes a connecting component for coupling the planes of the wing and the fuselage. The connecting component is able to accommodate a substantial relative rotation between the first plane and the fuselage. The vehicle further includes a plurality of wheels coupled to the bottom side of the fuselage.

45 Claims, 7 Drawing Sheets

U.S. PATENT DOCUMENTS

| | | | |
|---|---|---|---|
| 6,086,014 A | 7/2000 | Bragg, Jr. | |
| 6,129,306 A * | 10/2000 | Pham | 244/2 |
| 6,131,848 A | 10/2000 | Crow | |
| 6,224,012 B1 | 5/2001 | Wooley | |
| 6,619,584 B1 * | 9/2003 | Haynes | 244/2 |
| 6,786,450 B1 * | 9/2004 | Einstein | 244/2 |
| 2003/0201362 A1 * | 10/2003 | Yang | 244/2 |
| 2005/0242231 A1 * | 11/2005 | Yoeli | 244/23 R |

OTHER PUBLICATIONS

International Preliminary Examination Report corresponding to the PCT application No. PCT/US07/70139, date of mailing May 7, 2009, 13 pages total.

* cited by examiner

SYSTEM AND METHOD FOR A FLYABLE AND ROADABLE VEHICLE

CROSS-REFERENCES TO RELATED APPLICATIONS

This application claims priority to U.S. Provisional Patent Application No. 60/830,650 filed Jul. 12, 2006 titled "Dual Use Vehicle" by inventor Junfeng Xu, which is incorporated by reference herein for all purposes.

The application additionally claims priority to U.S. Provisional Patent Application No. 60/832,335 filed on Jul. 22, 2006 titled "Dual Use Vehicle" by inventor Junfeng Xu, which is incorporated by reference herein for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to flyable and roadable vehicles and the use thereof. More particularly, the invention provides a method and system for vehicles that are suitable for both land and air traveling. Merely by way of example, the invention has been applied to the dual use vehicles with alternative operation modes and configurations. But it would be recognized that the invention has a much broader range of applicability.

The ability to fly has been an aspiration for human beings for many centuries. Thousands of years ago, ancient Chinese attempted flying with manmade feathery wings. Leonardo da Vinci designed ornithopter in the fifteenth century. Various types of gliders and air balloons had been made before the twentieth century in the pursuit of this aspiration. However, it was not until 1903, when the Wright brothers of the United States made the first controlled and sustained heavier than air flight, an era of innovation and prosperity of aviation started.

Over the last one hundred years, various types of flying vehicles have been invented and improved. Airplanes today are capable of flying at high speeds and over long distances. Yet as of now, flying vehicles are by far less common than automobiles as a transportation tool due to various inconveniences. Among other things, aircrafts are designed for air traveling and are not suitable for land traveling. For many people, it is simply impractical to have a vehicle that is only suitable for flying.

To develop a vehicle that is suitable for both land and air use has been a goal for many aviation innovators for decades. For example, conventional dual use vehicles with foldable or modular wings have been developed. Unfortunately, these conventional vehicles have been inadequate for real applications.

Therefore, it is desired to have an improved system and method for a flight-capable vehicle that is also capable of high speed land operation.

BRIEF SUMMARY OF THE INVENTION

The present invention is directed to flyable and roadable vehicles and the use thereof. More particularly, the invention provides a method and system for flight capable vehicles that are suitable for both land and air traveling. Merely by way of example, the invention has been applied to the dual use vehicles with alternative operation modes and configurations. It would be easily recognized that the invention has a much broader range of applicability.

A vehicle that can be used for air and high speed road travel. It has an integrated multi-plane wing. The multi-plane wing is mostly parallel to the longitudinal axis of the fuselage in road travel, and mostly transverse in air travel. The heights of some or all planes of the wings could be lowered in ground travel to lower the gravity center of the vehicle and to reduce the effect of cross-wind. The wing is changed between these two positions during travel mode transition, preferably by automatic mechanism to ease the operation and reduce the chance of human errors. The multi-plane structure significantly increases the total lifting area while keeps the projected wing area small. The one-piece construction of the wing lowers its weight, manufacture difficulty and cost, improves its structural strength, and reduces operational wear. It also facilitates the integration of flight control systems, including ailerons, flaps, slats, airbrakes, and sometimes wingtip rudders. In addition, it is to be appreciated that existing configurations on the wing, such as winglet, can be integrated easily.

Another objective of this invention is to provide a propulsion mechanism for the vehicle. Propeller propulsion by piston engines is the preferred choice for air travel due to its low cost, although jet engine propulsion is also compatible with such a vehicle. The propeller could be either in the front or at the rear of the vehicle, normally referred to as puller and pusher, or a combination of both. The combination scheme, with one propeller at the front and another one at the rear, allows each propeller to be smaller and shorter for the same total propulsion force. It also provides redundancy and improves the safety factor in the event of single propeller/engine failure. For road travel, the propulsion is preferably delivered to the wheels thru transmission systems. Propeller propulsion for road travel could cause foreign object entrainment, and the high speed propeller rotation would be a road hazard to other vehicles and pedestrians. The vehicle could have three or four, or even more wheels. The four wheel option is preferred for its stability and proven high speed highway performance.

Yet another objective of this invention is to increase the unblocked visual field for road travel. The propellers could have two blades or more. In the case of two blades, the blades are preferred to be in a horizontal position for road travel to clear the visual field for the driver. In the case of three blades, one of the blades would be pointing straight down for road travel; in the case of four blades, the blades will point in a direction that is 45 degree away from horizontal. These orientations increase the unblocked visual field for the driver. The blade could also be made of transparent material to enhance driver visibility. Similarly, the end portions of the multi-plane wing, which are on top of the vehicle for road travel, can be also made transparent to ease the visual observation of high road signs and traffic lights.

Yet another approach is to install a visual sensor like video camera at the front of the vehicle, and relay the image to the driver. Similar relayed video images could be used for rear and side views. Bending the outer portions of the planes of wings upward also allows better visual field. Other approaches include a reflecting mirror in the front portion of fuselage to allow the driver to read the traffic signs. The pusher configuration, which doesn't have a propeller in the front and allows the driver seat to be closer to the front of the vehicle, is especially attractive for a wide visual field. A combination of the techniques mentioned can be applied to effectively increase unblock visual field, including the front, rear and side views.

Yet another objective of this invention is to provide other flight control elements for the vehicle. They include the vertical tail (also called vertical stabilizer) and the horizontal tail. The vertical tail, which has rudder(s) for flight control, could be a single tail, or multi-tail such as twin or triple tail. The multi-tail structure has the advantage of large control surface with less height, an important consideration in a dual-use vehicle. The vertical tail can also be installed on the outer edge of the planes of the wings, or in the front portion of the fuselage. This configuration is especially attractive in case of a back propeller. The horizontal tail, which has the elevator for flight control, could be either in front of or aft the main wing, or a combination of both. In the first case it is call a canard. The horizontal tail could be mono-plane or multi-plane. The multi-plane tail would provide large control surface with less projected area.

According to an embodiment, the present invention provides a vehicle capable of air and road travel. The vehicle is adaptable to a flying configuration and a road configuration. The vehicle includes a fuselage and a wing component having a plurality of planes. The plurality of planes includes a first plane and a second plane. The vehicle additionally includes a connecting component for coupling the planes of the wing and the fuselage. The connecting component is able to accommodate a substantial relative rotation between the first plane and the fuselage. The vehicle further includes a plurality of wheels coupled to the bottom side of the fuselage. The plurality of wheels includes a front wheel and a rear wheel. Additionally, the vehicle has a propulsion component. The length of first plane is substantially perpendicular to the fuselage and substantially parallel to the second plane in the flying configuration. The length of the above mentioned plane of the wing is substantially parallel to the fuselage in the road configuration.

According to another embodiment, the present invention provides a method for converting a roadable aircraft for road travel. The roadable aircraft is adaptable to a flying configuration and a road configuration. The roadable aircraft includes a fuselage and a wing component that includes a first plane and a second plane. The method includes rotating the first plane so that its length is substantially parallel to the fuselage.

According to yet another embodiment, the present invention discloses a method for converting a flying car for flight. The flying car is adaptable to a flying configuration and a road configuration. The flying car includes a fuselage and a wing component that includes a first plane and a second plane. The method comprises rotating the first plane so that its length is substantially perpendicular to the fuselage.

Many benefits are achieved by way of the present invention over conventional techniques. For example, the present technique provides a roadable aircraft that is reliable, convenient, and economical. Compared to conventional designs, roadable aircraft according to the embodiment of the present invention is easy to manufacture, has high strength and light weight, and integrates conventional flight control elements. For example, embodiments of the present invention is suitable for average consumers, and can be used to significantly shorten the time for medium to long range travel. Depending upon the embodiment, one or more of these benefits may be achieved. These and other benefits will be described in more details throughout the present specification, particularly below.

Various additional objects, features and advantages of the present invention can be more fully appreciated with reference to the detailed description and accompanying drawings that follow.

DETAILED DESCRIPTION OF THE INVENTION

Figure 1A:
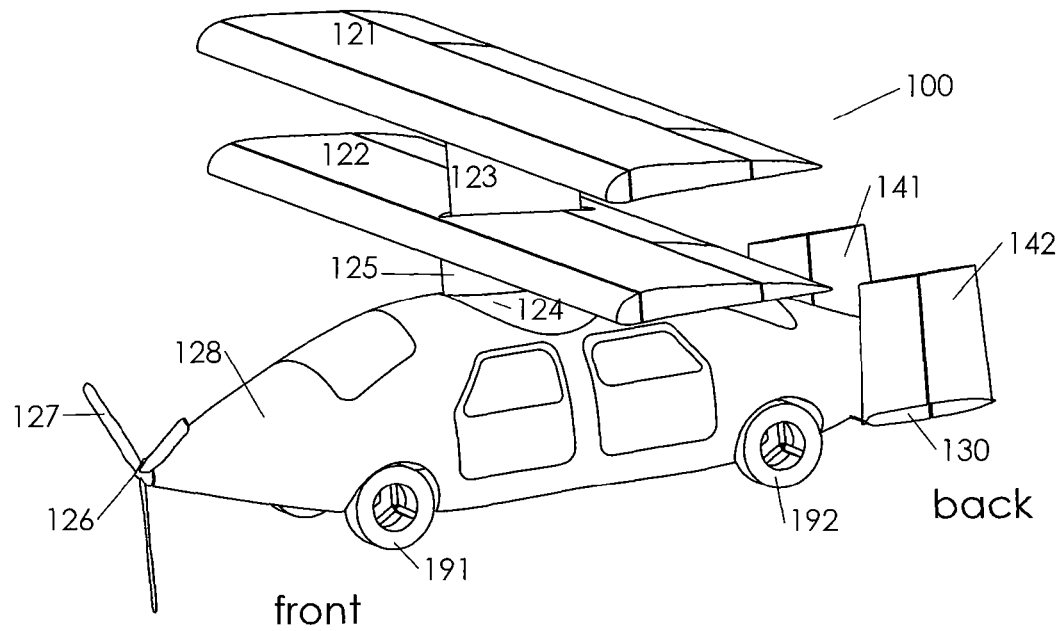
FIGS. 1A, 1B and 1C are diagrams illustrating a roadable aircraft according to an embodiment of the present invention.

The present invention is directed to flyable and roadable vehicles and the use thereof. More particularly, the invention provides a method and system for flight capable vehicles that are suitable for both land and air traveling. Merely by way of example, the invention has been applied to the dual use vehicles with alternative operation modes and configurations. But it would be recognized that the invention has a much broader range of applicability.

As explained above, vehicles that are capable of both land and air travel have been an aspiration for generations of aviators. In the mass media, this type of vehicles has been referred to as roadable aircrafts, roadable personal air vehicles, flying cars, etc. Typically, this type of vehicle is capable of legally travel on the road and can also be used as aircrafts. It is to be understood the vehicles according to embodiments of the present invention have a wide range of applications and should not be limited to the abovementioned characteristics.

Over the past, efforts have been made by various corporations and individuals to design a vehicle that is capable of and suitable for both land and air travel. Unfortunately, these efforts have yet been able to produce a commercially viable vehicle of this type. And often, the vehicles of this type developed over the past were unable to meet the design objectives for such a vehicle. For a vehicle to be street legal in most part of the world, a vehicle must not exceed a maximum width. For example, the United States requires that the vehicles operating on roads must not exceed a width of 8 feet 6 inches, or approximately 2.55 meters. However, the wing spans for most aircrafts are usually much larger than this limit, as typically large wings are necessary for providing sufficient aerodynamic lift for the vehicle.

In 1949, Molt Taylor designed and built Aerocar, a roadable aircraft, based on a modular design. An Aerocar is convertible to flight mode by attaching a pusher propeller and wings. On the road, propeller and the wings are detached from the Aerocar. With a wingspan of thirty-four feet, Aerocar is unsuitable for road travel with wings attached. Robert Fulton Jr.'s Airphibian applied similar modular design.

Roadable aircrafts with modular designs had little commercial success. There are drawbacks associated with the modular design. First of all, the detachable wings are generally structurally weak and unreliable. This type of aircrafts is often in danger of detachable wings being disengaged during flight. In addition, it is difficult to integrate necessary flight control components, such as aileron, flaps, slats, etc., in a modular design, since it is often necessary to build such flight components into the detachable wings, which is difficult. Moreover, the repeated operations of detachments and attachments of the wings require a high degree of mechanical skill and intense labor from the vehicle operator. As a result, it is difficult for the average consumer or operator to operate. In addition, the repeated operations of detachments and attachments are susceptible of human errors.

In an alternative approach, roadable aircrafts are implemented with wings that are integrated with the fuselages. Because the minimum length of wingspan that is needed for air travel often far exceeds the width of a street legal vehicle, the wings are usually adaptable of alternative configurations so that the roadable aircraft meets the width requirements. According to certain conventional technique, the wing of a roadable aircraft is folded and then rotated ninety degrees so that the folded wing is aligned with the longitudinal axis of the vehicle. By folding and rotating wings, width of the roadable aircraft is greatly reduced. In various conventional designs, folded wings are stowed at the side or on the top of the roadable aircraft. For flying, the fold wings are then restored to their full length to provide sufficient wing area.

In another approach, roadable aircrafts are implemented with extendable wings. While on the road, the wings of such roadable aircraft are retracted to reduce the width of the aircraft, in a fashion similar to the compression of a telescope. For flying, the wings are extended to their full length to provide sufficient wing area and airlift, again in a fashion similar to the extension of a telescope.

A big drawback for designs with foldable and/or extendable wings is that wings of such designs are typically weak, as these wings are segmented. In addition, the wings with foldable and/or extendable configuration are typically difficult to implement, as the integration of control components and control system is usually a challenging task to accomplish. Moreover, manufacturing costs for foldable and/or extendable wings are high.

Therefore, it is to be appreciated that various embodiments of the present invention provide a roadable aircraft with multi-plane wing component with rotatable wing configuration. Among other things, various designs according to the present invention provide wings with rigid structural integrity and large lifting area.

According to various embodiments, the present invention discloses a vehicle that can travel both in the air and on the road at relatively high speed. For example, a vehicle according to the present invention is capable of a speed that is comparable to the speed of a small plane when flying in the air, and to that of a car when moving on the road. As mentioned above, a specific embodiment of the roadable aircraft has a multi-plane wing component that is positioned on the top of the fuselage of the roadable aircraft. The multi-plane wing component is adaptable to alternative configurations. For example, when flying the multi-plane wing component is perpendicular to the fuselage; when road traveling is required, the multiple-plane wing component is rotated so that it is parallel to the fuselage, thus reducing the width of the roadable aircraft. More illustrations of specific embodiments are provided below. It is to be understood these embodiments merely provide examples, and within the scope and spirit of the present invention other variations and alternatives are available.

The use of multi-plane wings traced back to the historic flight by Wright brothers in 1903. The structural strength of multi-plane wings was at least one of the reasons that it was preferred in the early days of aeronautics. As the technology matured and the strength of monoplane wings improved, multi-plane wings became obsolete. In the early days of aeronautics, the multi-plane wings were fixed to the fuselage, with the bottom plane near or at the bottom of the fuselage to provide strong structure, ease of construction, and maximum separation between the planes. Multi-plane wings were not used in different orientations relative to fuselage. Their heights were also not adjustable. In comparison, embodiments of the present invention provides a vehicle that utilizes multi-plane wings with many added flexibility, and more important, for use on roadable aircrafts.

Figure 1B:
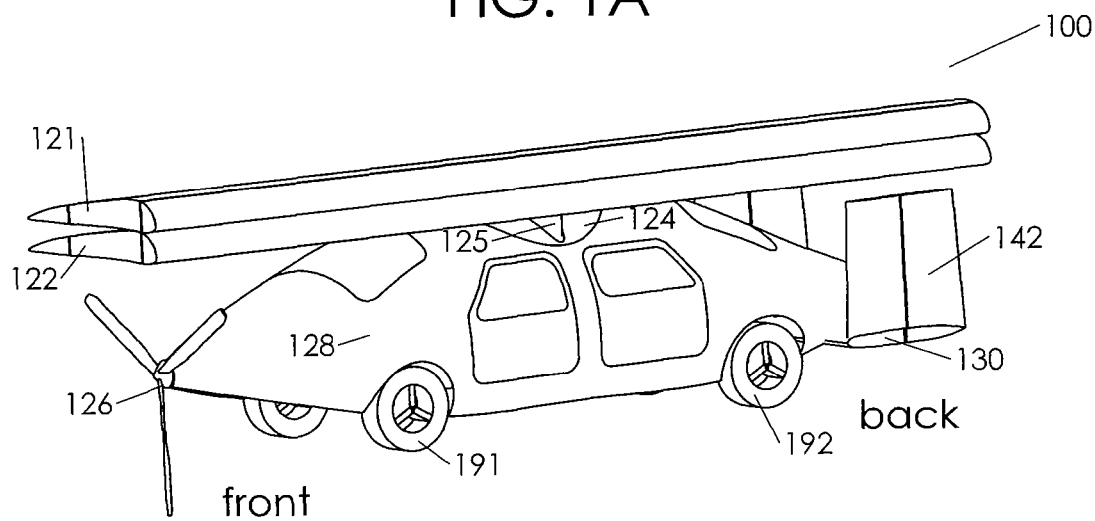
Figure 1C:
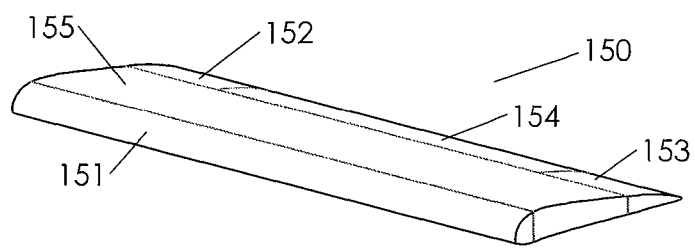

FIGS. 1A, 1B, and 1C are diagrams illustrating a roadable aircraft according to an embodiment of the present invention. These diagrams merely provide an example, which should not unduly limit the scope of the claims. One of ordinary skill in the art would recognize many variations, alternatives, and modifications.

FIG. 1A shows a roadable aircraft 100 in a flying configuration, FIG. 1B a road travel configuration. The roadable aircraft 100 includes the following components:

1. a fuselage 128;
2. planes 121 and 122;
3. a base 124;
4. a joint 125;
5. a second joint 123;
5. wheels 191 and 192;
6. vertical tails 141 and 142;
7. a horizontal tail 130; and
8. a propeller 126.

The fuselage 128 is aerodynamically shaped for both air and land travel. In the embodiment, the fuselage 128 has side doors for one or more passengers. Depending on specific applications, more or fewer doors may be implemented. Under the fuselage 128, there are wheels (e.g., wheels 191 and 192 as shown) that can be used for various purposes. For example, in addition to being used for moving on the road, the wheels are also used for taking off and landing operations when the roadable aircraft 100 is in the flying configuration. In certain applications, the wheels are retracted into the fuselage when flying to reduce air resistance. In the embodiment, the fuselage 128 is supported by four wheels during road travel. It is to be understood the roadable aircraft 100 may have different numbers of wheels. For example, the roadable aircraft may have two wheels (e.g., resembling a motorcycle), three wheels (e.g., one in the front and two in the back, or two in the front and one in the back), or other numbers of wheels.

The two planes 121 and 122, and the fuselage 128 are coupled together via the joints 123, 125, and the base 124. It is to be appreciated that the multi-plane configuration according to the embodiments of the present invention is not limited to two planes. For example, configurations with three or more planes may be used. It is to be appreciated that, when compared to a conventional single plane design, the multi-plane design provides a significant increase of lift surface without increasing the projected area or width. According to an embodiment, both planes 121 and 122 are one-piece in construction. It is to be appreciated that the one-piece design provides better reliability and rigidity when compared to a foldable or extendable design. In addition, the one-piece design is relatively easy and less expensive to manufacture. Moreover, the one-piece design makes the integration of flight control elements easy and natural. In a specific embodiment, one or more of the planes contain a mechanism to elongate the span of the planes. For example, the outer portion of a plane, or just the wingtip portion, can be folded onto the top of the plane for road travel, and unfolded to increase the span and the area of the plane for air travel. In another example, the plane could have a telescopic structure, and the outer portion of the plane can be retracted into the center of the inner portion of the plane for road travel, and extended to increase the span and the area of plane for air travel.

The relative position of the planes could have several variations for air travel. In one embodiment, the leading edge of the upper plane is right on top of the leading edge of the lower plane. In another embodiment, the leading edge of the upper plane is on top and in front of the leading edge of the lower plane; in yet another embodiment, the leading edge of the upper plane is on top of and behind the leading edge of the lower plane.

The positions of the planes relative to the fuselage could also have several variations. In an embodiment, all planes are substantially on the top side of the fuselage. In another embodiment, one or more planes are substantially on the bottom side of the fuselage.

FIG. 1C is a simplified diagram illustrating a one-piece plane of the wing of the roadable aircraft. For example, the plane 150 of the wing as shown is the plane 121 or 122 in FIG. 1A. As shown, the plane 150 of the wing includes integrated aerodynamic flight control elements, such as slat 151, flap 154, aileron 152 and 153, and airbrake 155. In various embodiments, these control elements may have different positions, shapes, aspect ratios, portions, arrangements, and relative size ratios from shown.

Now referring back to FIG. 1A. During air travel, both planes 121 and 122 are aligned in a direction perpendicular to the length of the fuselage, so that an airlift can be obtained for flying. For example, if a plane contains a mechanism to elongate its span and to increase its area, that mechanism is deployed to increase the airlift. As shown in FIG. 1A, the planes 121 and 122 are substantially rectangular in shape. For example, the rectangular shape of the planes allows a small width of the vehicle when the planes are rotated ninety degrees for road travel. It is to be understood that within the spirit of the present invention that other shapes are possible as well. For example, planes with taper and sweep design may also be implemented.

The propeller 126 is positioned at the front end of the fuselage. As shown, the propeller 126 has three blades 127, but it is to be understood that different numbers of blades are possible. Depending upon specific applications, other propeller configurations are possible, some of which are provided below. For example, the roadable aircraft 100 may instead have a rear propeller, or have both front and rear propellers. In certain embodiments, the propeller 126 may be detached.

At the back end of the fuselage, there are two vertical tails 141 and 142 and a horizontal tail 130. These tails usually have moveable parts to provide flight controls. It is to be appreciated that the two-vertical-tail design provides additional control surface and better rear view clearance when compared with designs of single vertical tail.

FIG. 1B shows the roadable aircraft 100 in a configuration that is suitable for road travel. This diagram is merely an example, which should not unduly limit the scope of the claims. One of ordinary skill in the art would recognize many variations, alternatives, and modifications. As shown, the planes 121 and 122 are lowered and rotated. For example, the joint 123 and 125 as shown in FIG. 1A, when retracted back into the fuselage 128 thru base 124, allows the planes 121 and 122 to be lowered. In a specific embodiment, the joint 123 is rigidly coupled to the top plane 121 thru the bottom of the top plane 121, while joint 125 is rigidly coupled to the lower plane 122 thru the bottom of the lower plane 122. For road travel, both joints are lowered into the base 124 as shown in FIG. 1B, with the lower portion of joint 123 inside joint 125. According to the present invention, other configurations for lowering the planes can be used. It is to be appreciated that by lowering the planes, the roadable aircraft 100 now has a lower center of gravity (i.e., a higher degree of stability) for road travel. In certain embodiments, the joint 123 does not move vertically, and the planes are not lowered for road travel. In the embodiment that a plane employs a mechanism to elongate its span for flight, the mechanism should be reversed to reduce the span of the plane for road travel. For example, if a plane has a telescopic structure, the outer portion of the plane should be retracted into the inner portion of the plane to reduce its span for road travel.

In a specific embodiment, the base 124 is provided for rotating the planes. In certain embodiments, the base 124 additionally includes room for lowering the joints 125 and 123. To convert the roadable aircraft 100 from air travel to land travel, the base 124 is rotated ninety degrees, causing the wings to be substantial parallel to the length of the fuselage. If a plane contains a mechanism to elongate its span and to increase its area, that mechanism should be reversed to reduce the span of the plane. According to certain embodiments when the joints 125 and 123 are stored within the base 124 and the base 124 is rotated, the joints 125 and 123 and the base 124 are locked to the fuselage and each other. In a specific embodiment, a vibration-reduction mechanism is provided to ensure the mechanical strength and reliability of the locking mechanism.

To convert the roadable aircraft 100 from road travel configuration to flying configuration, the planes 121 and 122 are raised and rotated so that the planes are perpendicular to the length of the fuselage. If a plane contains a mechanism to elongate its span and to increase its area, that mechanism should be deployed to increase the airlift. Additional adjustments, such as adjusting the tail position, may also be made. In various embodiments, the conversions between road and air configurations are performed automatically. In a specific embodiment, the conversions between road and air configurations are performed manually.

Figure 2A:
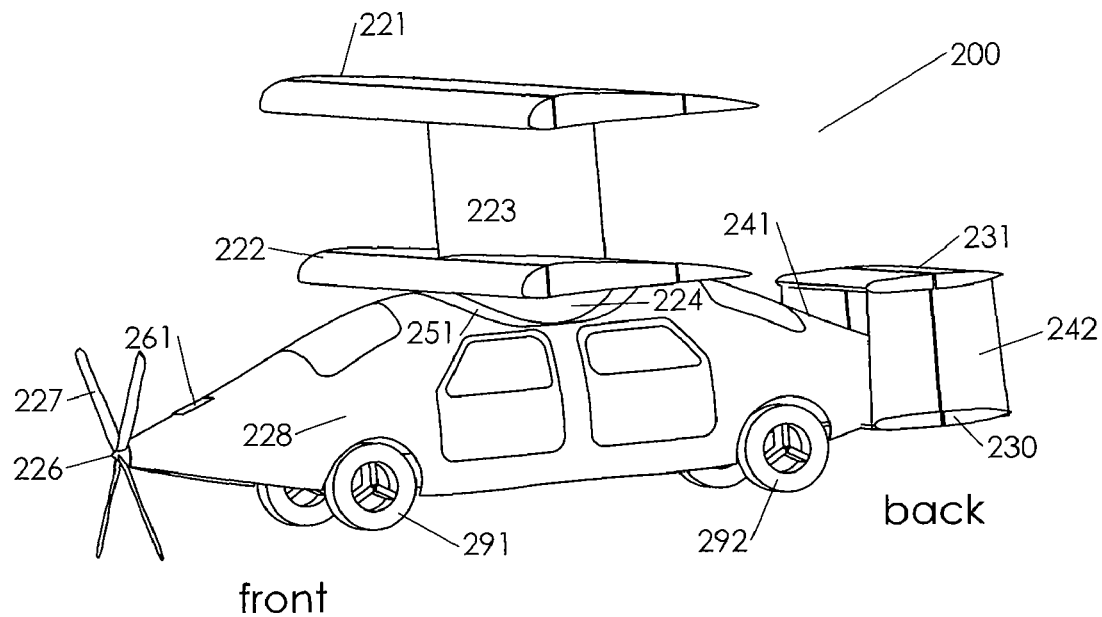
FIGS. 2A and 2B are diagrams illustrating a roadable aircraft according to another embodiment of the present invention.
Figure 2B:
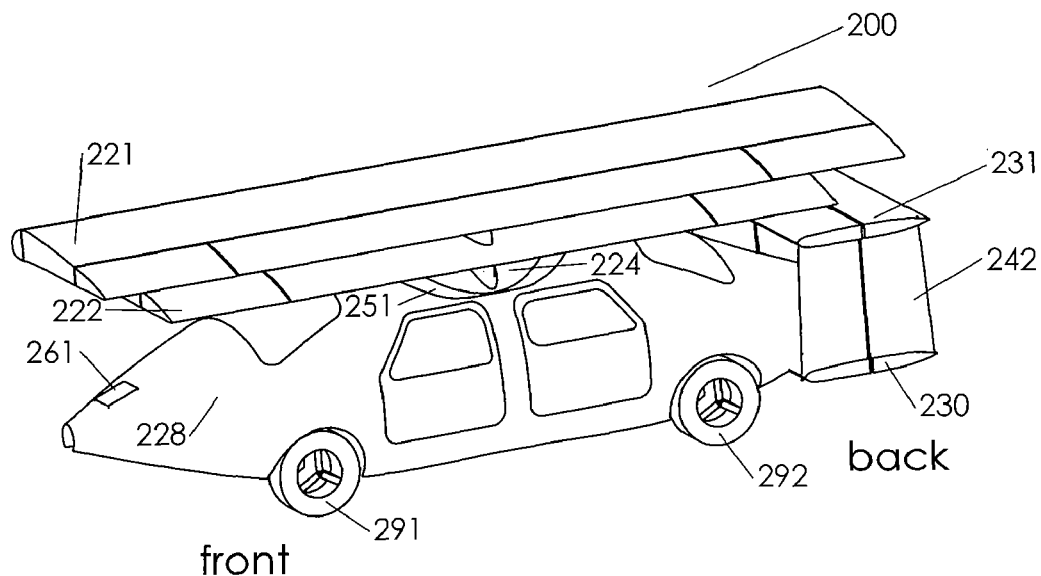

FIGS. 2A and 2B are diagrams illustrating a roadable aircraft according to an embodiment of the present invention. These diagrams merely provide an example, which should not unduly limit the scope of the claims. One of ordinary skill in the art would recognize many variations, alternatives, and modifications.

FIG. 2A shows a roadable aircraft 100 in a flying configuration, FIG. 2B a road travel configuration. The roadable aircraft 200 includes the following components:

1. a fuselage 228;
2. planes 221 and 222;
3. a base 224;
4. a base track 251;
5. a joint 223;
6. wheels 291 and 292;
7. vertical tails 241 and 242;
8. horizontal tails 230 and 231;
9. a propeller 226; and
10. a reflective mirror 261.

The fuselage 228 is aerodynamically shaped for both air and land travel. In the embodiment, the fuselage 228 has side doors for one or more passengers. Depending on specific applications, more or fewer doors may be implemented. Under the fuselage 228, there are wheels (e.g., wheels 291 and 292 as shown) that can be used for various purposes. For example, in addition to being used for moving on the road, the wheels are also used for taking off and landing operations when the roadable aircraft 200 is in the flying configuration. In certain applications, the wheels are retracted into the fuselage when flying to reduce air resistance. In the embodiment, the fuselage 228 is supported by four wheels during road travel. It is to be understood the roadable aircraft 200 may have different numbers of wheels. For example, the roadable aircraft may have two wheels (e.g., resembling a motorcycle), three wheels (e.g., one in the front and two in the back, or two in the front and one in the back), or other numbers of wheels.

The plane 222 is coupled to the plane 221 and the fuselage 228 via the joint 223, the base 224 and the base track 251. It is to be appreciated that the multi-plane configuration according to the embodiments of the present invention is not limited to two planes. For example, configurations with three or more planes may be used. It is to be appreciated that, when compared to a conventional single plane design, the multi-plane design provides a significant increase of lift surface without increasing the projected area or width. According to an embodiment, both planes 221 and 222 are one-piece in construction. It is to be appreciated that the one-piece design provides better reliability and rigidity when compared to a foldable or extendable design. In addition, the one-piece design is relatively easy and less expensive to manufacture. Moreover, the one-piece design makes the integration of flight control elements easy and natural. According to another embodiment, one or more of the planes contain a mechanism to elongate the span of the planes. For example, the outer portion of a plane, or just the wingtip portion, can be folded onto the top of the plane for road travel, and unfolded to increase the span and the area of the plane for air travel. In another example, the plane could have a telescopic structure, and the outer portion of the plane can be retracted into the center of the inner portion of the plane for road travel, and extended to increase the span and the area of plane for air travel.

During air travel, both planes 221 and 222 are aligned in a direction perpendicular to the length of the fuselage, so that an airlift can be obtained for flying. As shown in FIG. 2A, the planes 221 and 222 are substantially rectangular in shape. For example, the rectangular shape of the planes allows a small width of the vehicle when the planes are rotated ninety degrees for road travel. As can be seen from FIG. 2A, the planes 221 and 222 are different in length, with the lower plane 222 being shorter. Among other things, the shorter length of the lower plane 222 provides the vehicle operator with additional visual clearance when traveling on the road. It is to be understood that within the spirit of the present invention that other shapes are possible as well. For example, planes with taper and sweep design may also be implemented. For air travel, a balanced weight distribution is required for good flight control and good flight efficiency. The base track 251 provides a degree of freedom for such weight distribution adjustment. For example, the base 224 can move forward and backward in the base track 251 to find a good location that can balance the weights of payloads, such as pilots, passengers, fuel, luggage, etc.

The propeller 226 is positioned at the front end of the fuselage. As shown, the propeller 226 has four blades 227, but it is to be understood that different numbers of blades are possible. Depending upon specific applications, other propeller configurations are possible, some of which are provided below. For example, the roadable aircraft 200 may instead have a rear propeller, or have both front and rear propellers. In certain embodiments, the propeller 226 may be detached.

At the back end of the fuselage, there are two vertical tails 241 and 242, and two horizontal tails 230 and 231. It is to be appreciated that the multi-tail configuration according to embodiments of the present invention is not limited to two tails. For example, configurations with three or more tails may be used, and the number of vertical tails may be different from the number of horizontal tails. It is also to be appreciated that the multi-horizontal-tail designs provide additional control surface and better rear view clearance when compared with designs with single horizontal tails, while the multi-vertical-tail designs provide more control surface, lower tail height when compared with designs with single vertical tails.

FIG. 2B shows the roadable aircraft 200 in a configuration that is suitable for road travel. This diagram is merely an example, which should not unduly limit the scope of the claims. One of ordinary skill in the art would recognize many variations, alternatives, and modifications. As shown, the top plane 221 is lowered and rotated. For example, the joint 223 as shown in FIG. 2A, allows the top plane 221 to be lowered in to the base 224. According to the present invention, other configurations for lowering the planes can be used. It is to be appreciated that by lowering the planes, the roadable aircraft 200 now has a lower center of gravity (i.e., a higher degree of stability) for road travel. It also reduces the effect of crosswind on the vehicle. In certain embodiments, the joint 223 does not move vertically and the planes are not lowered for road travel. In the embodiment that a plane employs a mechanism to elongate its span for flight, the mechanism should be reversed to reduce the span of the plane for road travel. For example, if a plane has a telescopic structure, the outer portion of the plane should be retracted into the inner portion of the plane to reduce its span for road travel. In some embodiments, the propeller 226 is removed. This reduces the air resistance, and enhances visual clearance for road travel.

In a specific embodiment, the base 224 is provided for rotating the planes. In certain embodiments, the base 224 additionally includes room for lowering the joint 223. To convert the roadable aircraft 200 from air travel to land travel, the base 224 is rotated ninety degrees, causing the wings to be substantial parallel to the length of the fuselage. If a plane contains a mechanism to elongate its span and to increase its area, that mechanism should be reversed to reduce the span of the plane. The base 224 can then move along base track 251 to a different position. This position can provide better weight distribution for high speed land travel, or better visual clearance for the driver. According to certain embodiments when the joint 223 is stored within the base 224 and the base 224 is rotated, the joint 223, the base 224 and the base track 251 are locked to the fuselage and each other. In a specific embodiment, a vibration-reduction mechanism is provided to ensure the mechanical strength and reliability of the locking mechanism. In certain embodiments, the direction for rotating planes alternates for each trip to help maintain the balance and symmetry of the planes.

The roadable aircraft 200 also includes a reflective mirror 261 positioned at the front portion of the fuselage. For example, the mirror 261 is not blocked by the planes when traveling on the road, thus provides additional degrees of visibility. In addition to the reflective mirror 261 in the front, the roadable aircraft 200 may also include rear and side view mirrors for improved visibility.

To convert the roadable aircraft 200 from road travel configuration to flying configuration, the planes 221 and 222 are rotated so that the planes are perpendicular to the length of the fuselage. The upper plane 221 is also raised to obtain an airlift. If a plane contains a mechanism to elongate its span and to increase its area, that mechanism should be deployed to increase the airlift. The base 224 then travels in the base track 251 to obtain a better weight distribution. Additional adjustments, such as adjusting the tail position, may also be made. In various embodiments, the conversions between road and air configurations are performed automatically. In a specific embodiment, the conversions between road and air configurations are performed manually.

Figure 3A:
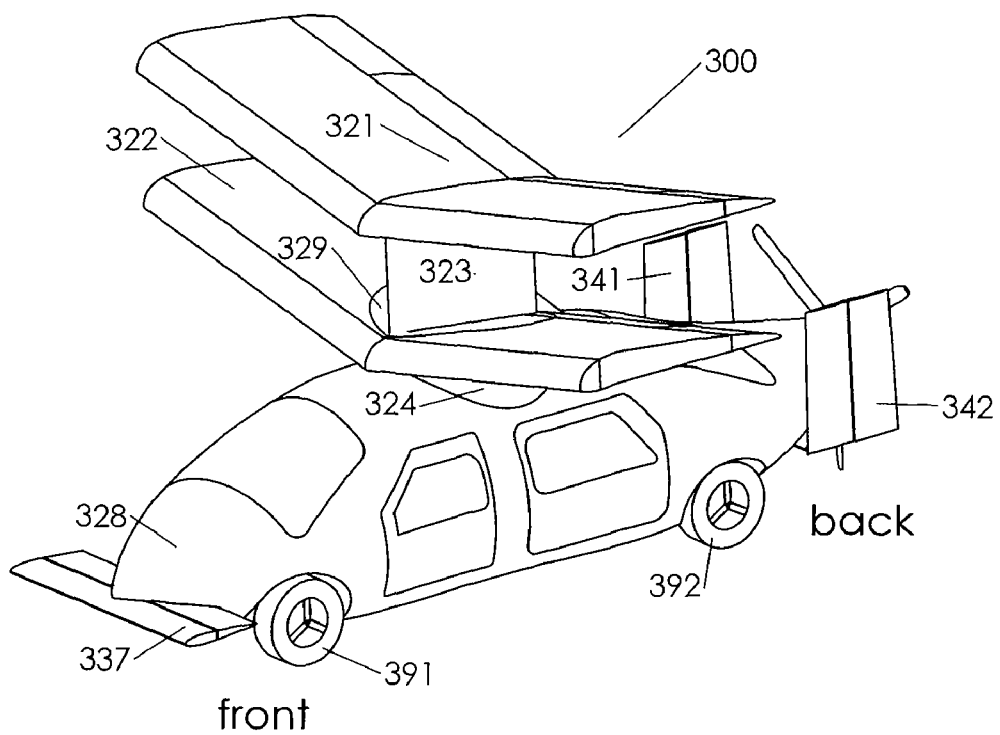
FIGS. 3A and 3B are diagrams illustrating a roadable aircraft according to yet another embodiment of the present invention.
Figure 3B:
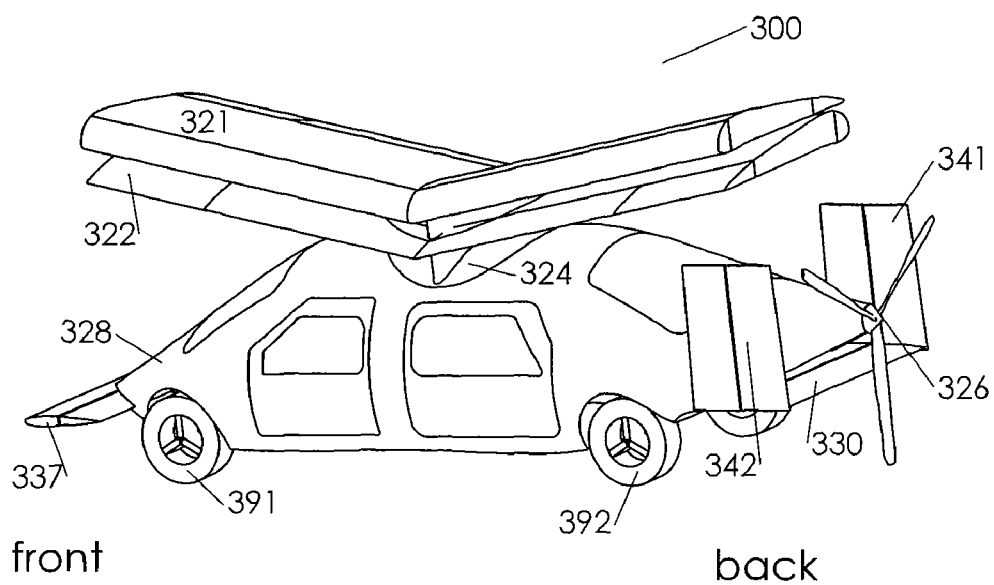

FIGS. 3A and 3B are diagrams illustrating a roadable aircraft according to an embodiment of the present invention. These diagrams merely provide an example, which should not unduly limit the scope of the claims. One of ordinary skill in the art would recognize many variations, alternatives, and modifications.

FIG. 3A shows a roadable aircraft 100 in a flying configuration, FIG. 3B a road travel configuration. The roadable aircraft 300 includes the following components:
1. a fuselage 328;
2. planes 321 and 322;
3. a base 324;
4. a second base 329;
5. a joint 323;
6. wheels 391 and 392;
7. vertical tails 341 and 342;
8. horizontal tail 330;
9. a propeller 326; and
10. a canard 337.

The fuselage 328 is aerodynamically shaped for both air and land travel. In the embodiment, the fuselage 328 has side doors for one or more passengers. Depending on specific applications, more or fewer doors may be implemented. Under the fuselage 328, there are wheels (e.g., wheels 391 and 392 as shown) that can be used for various purposes. For example, in addition to being used for moving on the road, the wheels are also used for taking off and landing operations when the roadable aircraft 300 is in the flying configuration. In certain applications, the wheels are retracted into the fuselage when flying to reduce air resistance. In the embodiment, the fuselage 328 is supported by four wheels during road travel. It is to be understood the roadable aircraft 300 may have different numbers of wheels. For example, the roadable aircraft may have two wheels (e.g., resembling a motorcycle), three wheels (e.g., one in the front and two in the back, or two in the front and one in the back), or other numbers of wheels.

The two planes 321 and 322 are coupled to each other via the joint 323 and the base 329. It is to be appreciated that the multi-plane configuration according to the embodiments of the present invention is not limited to two planes. For example, configurations with three or more planes may be used. It is to be appreciated that, when compared to a conventional single plane design, the multi-plane design provides a significant increase of lift surface without increasing the projected area or width. According to an embodiment, both planes 321 and 322 are one-piece in construction. It is to be appreciated that the one-piece design provides better reliability and rigidity when compared to a foldable or extendable design. In addition, the one-piece design is relatively easy and less expensive to manufacture. Moreover, the one-piece design makes the integration of flight control elements easy and natural.

Depending upon the specific application, the relative position of the planes could have several variations for air travel. In one embodiment, the leading edge of the upper plane is right on top of the leading edge of the lower plane. In another embodiment, the leading edge of the upper plane is on top and in front of the leading edge of the lower plane; in yet another embodiment, the leading edge of the upper plane is on top of and behind the leading edge of the lower plane.

During air travel, both planes 321 and 322 are aligned in a direction perpendicular to the length of the fuselage, so that an airlift can be obtained for flying. As shown in FIG. 3A, the planes 321 and 322 are in a dihedral configuration. For example, the dihedral configuration provides stability for air travel. In addition, when rotated for road travel, the dihedral configuration provides additional visual clearance. It is to be understood that within the spirit of the present invention that other shapes and/or configurations are possible as well.

The propeller 326 is positioned at the rear end of the fuselage 328. In certain embodiments, the rear end of the fuselage 328 is raised so a large propeller can be used. As shown, the propeller 326 has three blades, but it is to be understood that different numbers of blades are possible. Depending upon specific applications, other propeller configurations are possible, some of which are provided below. For example, the roadable aircraft 300 may instead have a front propeller, or have both front and rear propellers. In certain embodiments, the propeller 326 may be detached for road travel. By having the propeller at the rear end of the roadable aircraft 300, it is possible to move the operator of the aircraft closer to the front, thus providing additional visibility and clearance. In a specific embodiment, the placement of the propeller at the back of the fuselage allows a better weight distribution to be achieved.

At the back end of the fuselage, there are two vertical tails 341 and 342, and a horizontal tail 330. It is to be appreciated that the two-vertical-tail design provides additional control surface and better rear view clearance when compared with designs with single vertical tails. In certain embodiments, other tail configurations are possible. For example, tails may have moveable parts to offer various degrees of freedom that can be used for flight control.

At the front end of the fuselage, there is the canard 337. The canard 337 may have moveable parts for flight control. Among other things, the canard 337 helps the roadable aircraft 300 to balance and provides stall resistance in flying.

FIG. 3B shows the roadable aircraft 300 in a configuration that is suitable for road travel. This diagram is merely an example, which should not unduly limit the scope of the claims. One of ordinary skill in the art would recognize many variations, alternatives, and modifications. As shown, the planes are rotated to become parallel to the length of the fuselage. In a specific embodiment, the two planes are rotated in opposite directions. As an example, opposite directions of rotation provide a more symmetric weight distribution. Merely by way of an example, the joint 323 as shown in FIG. 3A, allows the top plane 321 to be lowered in to the bases 329 and 324. According to the present invention, other configurations for lowering the plane can be used. It is to be appreciated that by lowering the plane, the roadable aircraft 300 now has a lower center of gravity (i.e., a higher degree of stability) for road travel, and lower susceptibility to crosswind. In certain embodiments, the joint 323 does not move vertically and the planes are not lowered for road travel.

In certain embodiments, the positions for the planes and the fuselage are carefully adjusted. One detail is the height of the wing and propeller and their relative position in road travel. In certain embodiments, the propeller is lowered when the planes are rotated for road travel. More over, the specific blade angle for the propeller may be adjusted. For example, with a three-blade propeller, by having one blade pointing directly to the ground, a minimal height for the propeller is achieved.

In a specific embodiment, the bases 324 and 329 are provided for rotating the planes. In certain embodiments, the bases 324 and 329 additionally include room for lowering the joint 323. To convert the roadable aircraft 300 from air travel to land travel, the base 324 is rotated in one direction ninety degrees, causing the wing to be substantially parallel to the length of the fuselage, and the leading edge of the lower plane 322 during flying to be along the right side of the fuselage. Then the base 329 is rotated in the other direction for one hundred and eighty degrees, causing the leading edge of the upper plane 321 during flying to be along the left side of the fuselage. And finally the joint 323 is lowered to lower the upper plane 321. According to certain embodiments when the joint 323 is stored within the bases 324 and 329, and both bases 324 and 329 are rotated, the joint 323 and the bases 324 and 329 are locked to the fuselage and each other. In a specific embodiment, a vibration-reduction mechanism is provided to ensure the mechanical strength and reliability of the locking mechanism. In certain embodiments, the direction for rotating planes is alternated for each trip to help maintain the balance and symmetry of the planes.

To convert the roadable aircraft 300 from road travel configuration to flying configuration, the planes 321 and 322 are rotated so that the planes are perpendicular to the length of the fuselage with proper leading edges. The plane 321 is also raised to create an airlift. Additional adjustments, such as adjusting the tail position, may also be made. In various embodiments, the conversions between road and air configurations are performed automatically. In a specific embodiment, the conversions between road and air configurations are performed manually.

Figure 4A:
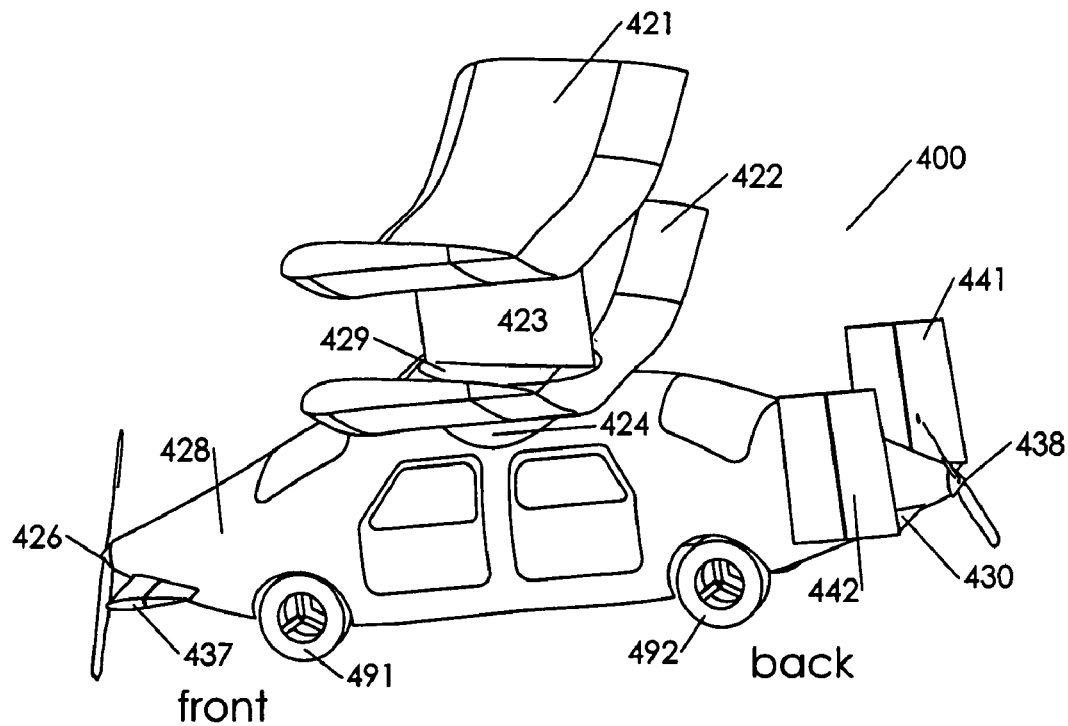
FIGS. 4A and 4B are diagrams illustrating a roadable aircraft according to yet another embodiment of the present invention.
Figure 4B:
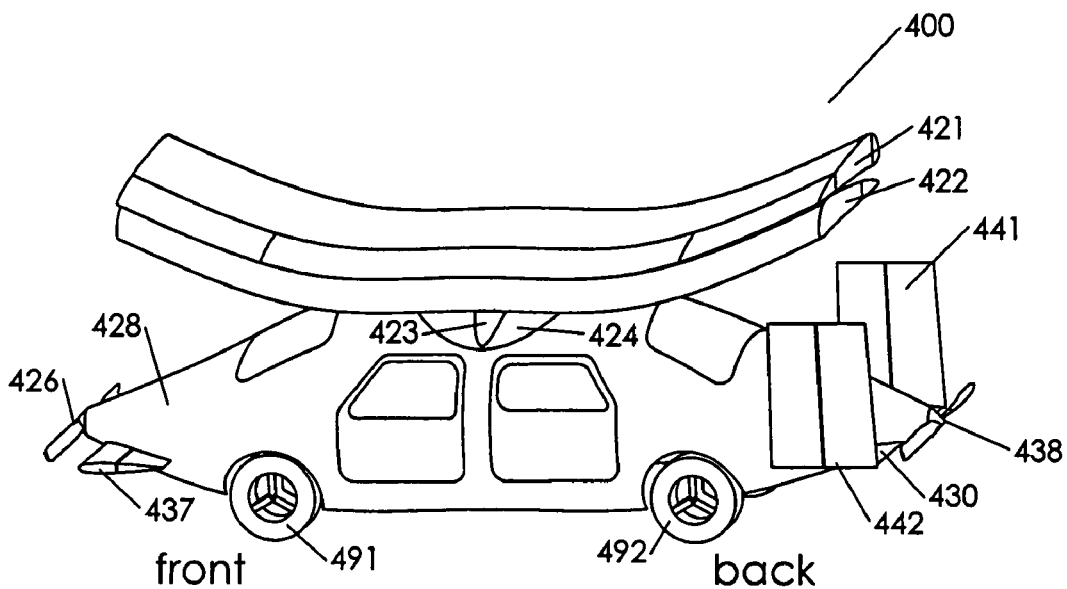

FIGS. 4A and 4B are diagrams illustrating a roadable aircraft according to an embodiment of the present invention. These diagrams merely provide an example, which should not unduly limit the scope of the claims. One of ordinary skill in the art would recognize many variations, alternatives, and modifications.

FIG. 4A shows a roadable aircraft 100 in a flying configuration, FIG. 4B a road travel configuration. The roadable aircraft 400 includes the following components:
1. a fuselage 428;
2. planes 421 and 422;
3. a base 424;
4. a second base 429;
5. a joint 423;
6. wheels 491 and 492;
7. vertical tails 441 and 442;
8. propellers 426 and 438;
9. a canard 437; and
10. a horizontal tail 430.

The fuselage 428 is aerodynamically shaped for both air and land travel. In the embodiment, the fuselage 428 has side doors for one or more passengers. Depending on specific applications, more or fewer doors may be implemented. Under the fuselage 428, there are wheels (e.g., wheels 491 and 492 as shown) that can be used for various purposes. For example, in addition to being used for moving on the road, the wheels are also used for taking off and landing operations when the roadable aircraft 400 is in the flying configuration. In certain applications, the wheels are retracted into the fuselage when flying to reduce air resistance. In the embodiment, the fuselage 428 is supported by four wheels during road travel. It is to be understood the roadable aircraft 400 may have different numbers of wheels. For example, the roadable aircraft may have two wheels (e.g., resembling a motorcycle), three wheels (e.g., one in the front and two in the back, or two in the front and one in the back), or other numbers of wheels.

The two planes 421 and 422 are coupled to each other via the joint 423 and the base 429. It is to be appreciated that the multi-plane configuration according to the embodiments of the present invention is not limited to two planes. For example, configurations with three or more planes may be used. It is to be appreciated that, when compared to a conventional single plane design, the multi-plane design provides a significant increase of lift surface without increasing the projected area or width. According to an embodiment, both planes 421 and 422 are one-piece in construction. It is to be appreciated that the one-piece design provides better reliability and rigidity when compared to a foldable or extendable design. In addition, the one-piece design is relatively easy and less expensive to manufacture. Moreover, the one-piece design makes the integration of flight control elements easy and natural.

During air travel, both planes 421 and 422 are aligned in a direction perpendicular to the length of the fuselage, so that an airlift can be obtained for flying. As shown in FIG. 4A, the planes 421 and 422 are in a dihedral configuration. For example, the dihedral configuration provides stability for air travel. In addition, when rotated for road travel, the dihedral configuration provides additional visual clearance. It is to be understood that within the spirit of the present invention that other shapes and/or configurations are possible as well.

The propeller 438 is positioned at the back end of the fuselage 428. In certain embodiments, the back end of the fuselage 428 is raised so a large propeller can be used. As shown, the propeller 438 has two blades, but it is to be understood that different numbers of blades are possible. The roadable aircraft 400 additionally includes a front propeller 426, which has two blades, but it is to be understood that different numbers of blades are possible. Depending upon specific application, the propellers may be powered by separate engines or one single engine. It is to be appreciated that when the propellers are powered by independent engines, the vehicle still has power available when one engine or one propeller malfunctions, thus a higher degree of safety is achieved. In certain embodiments, the propellers 426 and 438 are detachable.

At the tail end of the fuselage, there are two vertical tails 441 and 442. It is to be appreciated that the two-vertical-tail design provides additional control surface and better rear view clearance when compared with designs with single vertical tails. In certain embodiments, other tail configurations are possible. For example, tails may have moveable parts to offer various degrees of freedom that can be used for flight control.

At the front end of the fuselage, there is the canard 437. Among other things, the canard 437 helps the roadable aircraft 400 to balance and provides stall resistance in flying. It may also have moveable part for flight control.

FIG. 4B shows the roadable aircraft 400 in a configuration that is suitable for road travel. This diagram is merely an example, which should not unduly limit the scope of the claims. One of ordinary skill in the art would recognize many variations, alternatives, and modifications. As shown, the planes are rotated to become parallel to the length of the fuselage. In a specific embodiment, the two planes are rotated in opposite directions. As an example, opposite directions of rotation provides more symmetric weight distribution. Merely by way of an example, the joint 423 as shown in FIG. 4A, allows the top plane 421 to be lowered in to the bases 429 and 424. According to the present invention, other configurations for lowering the planes can be used. It is to be appreciated that by lowering the planes, the roadable aircraft 400 now has a lower center of gravity (i.e., a higher degree of stability) for road travel. It also has less susceptibility to crosswind. In certain embodiments, the joint 423 does not move vertically, and the planes are not lowered for road travel.

In certain embodiments, the propellers may have variable pitches to improve their performance over a wide speed range. For road travel, the position of the blades can be fixed to a specific angle for visual clearance and floor clearance. For example, a two-blade propeller would have the blades parallel to the ground. The pitch angles of the blades are also important during high speed road travel when the power is delivered to the wheels thru a transmission, for it produces both aerodynamic drag and torque. These two effects reduce the efficiency and balance of the vehicle, and are generally not desired. In some embodiments, the pitch angles are adjusted to reduce these two effects for road travel.

In a specific embodiment, the base 424 is provided for rotating the planes, and the base 429 is provided for rotating the joint 423 and the upper plane 421. In certain embodiments, the bases 424 and 429 additionally include room for lowering the joint 423. To convert the roadable aircraft 400 from air travel to land travel, the base 424 is rotated ninety degrees, causing the lower plane 422 to be substantially parallel to the length of the fuselage, and its leading edge during flying to be along the left side of the fuselage. The base 429 rotates in the other direction, causing the upper plane 421 to be substantially parallel to the length of the fuselage, and its leading edge during flying to be along the right side of the fuselage. According to certain embodiments, when the joint 423 is stored within the bases 429 and 424, and the bases 429 and 424 are rotated, the joint 423 and the bases 429 and 424 are locked to the fuselage and each other. In a specific embodiment, a vibration-reduction mechanism is provided to ensure the mechanical strength and reliability of the locking mechanism. In certain embodiments, the directions for rotating planes are alternated for each trip to help maintain the balance and symmetry of the planes and the vehicle.

To convert the roadable aircraft 400 from road travel configuration to flying configuration, the planes 421 and 422 are rotated so that the planes are perpendicular to the length of the fuselage with proper leading edges. The plane 421 is then raised by raising joint 423. Additional adjustments, such as adjusting the tail position, may also be made. In various embodiments, the conversions between road and air configurations are performed automatically. In a specific embodiment, the conversions between road and air configurations are performed manually.

Figure 5A:
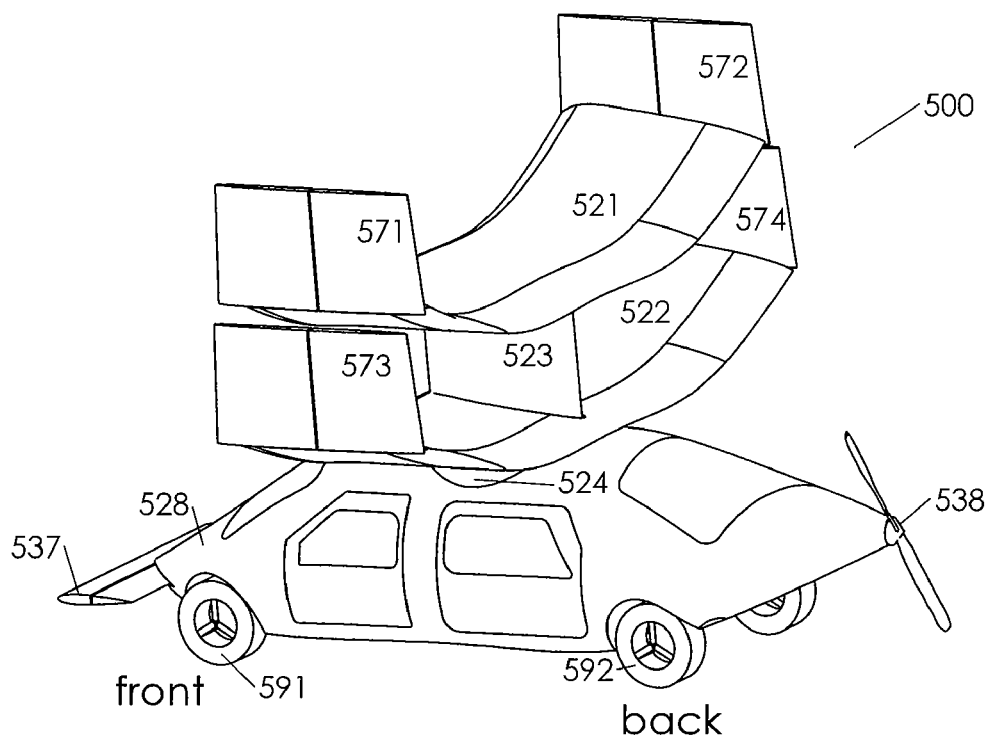
FIGS. 5A and 5B are diagrams illustrating a roadable aircraft according to yet another embodiment of the present invention.
Figure 5B:
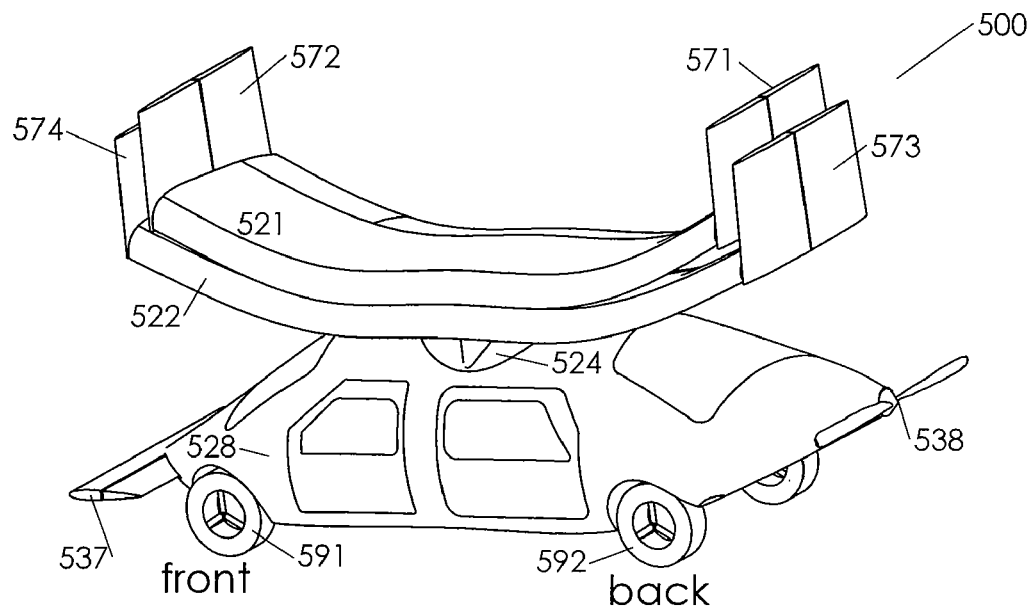

FIGS. 5A and 5B are diagrams illustrating a roadable aircraft according to an embodiment of the present invention. These diagrams merely provide an example, which should not unduly limit the scope of the claims. One of ordinary skill in the art would recognize many variations, alternatives, and modifications.

FIG. 5A shows a roadable aircraft 100 in a flying configuration, FIG. 5B a road travel configuration. The roadable aircraft 500 includes the following components:

1. a fuselage 528;
2. planes 521 and 522, which include wingtip rudders 571, 572, 573 and 574;
3. a base 524;
4. a joint 523;
5. wheels 591 and 592;
6. a propellers 538; and
7. a canard 537.

The fuselage 528 is aerodynamically shaped for both air and land travel. In the embodiment, the fuselage 528 has side doors for one or more passengers. Depending on specific applications, more or fewer doors may be implemented.

Under the fuselage 528, there are wheels (e.g., wheels 591 and 592 as shown) that can be used for various purposes. For example, in addition to being used for moving on the road, the wheels are also used for taking off and landing operations when the roadable aircraft 500 is in the flying configuration. In certain applications, the wheels are retracted into the fuselage when flying to reduce air resistance. In the embodiment, the fuselage 528 is supported by four wheels during road travel. It is to be understood the roadable aircraft 500 may have different numbers of wheels. For example, the roadable aircraft may have two wheels (e.g., resembling a motorcycle), three wheels (e.g., one in the front and two in the back, or two in the front and one in the back), or other numbers of wheels.

The two planes 521 and 522 are coupled to each other via the joint 523 and the base 524. It is to be appreciated that the multi-plane configuration according to the embodiments of the present invention is not limited to two planes. For example, configurations with three or more planes may be used. It is to be appreciated that, when compared to a conventional single plane design, the multi-plane design provides a significant increase of lift surface without increasing the projected area or width. According to an embodiment, both planes 521 and 522 are one-piece in construction. It is to be appreciated that the one-piece design provides better reliability and rigidity when compared to a foldable or extendable design. In addition, the one-piece design is relatively easy and less expensive to manufacture. Moreover, the one-piece design makes the integration of flight control elements easy and natural.

During air travel, both planes 521 and 522 are aligned in a direction perpendicular to the length of the fuselage, so that an airlift can be obtained for flying. As shown in FIG. 5A, the planes 521 and 522 are in a dihedral configuration. For example, the dihedral configuration provides stability for air travel. In addition, when rotated for road travel, the dihedral configuration provides additional visual clearance. It is to be understood that within the spirit of the present invention that other shapes and/or configurations are possible as well.

The plane 521 includes wing tip rudders 571 and 572, and the plane 522 includes wing tip rudders 573 and 574. As an example, the rudders provide control and stability during air travel, and eliminate the need of vertical tail components. It is to be appreciated that the absence of the tail component provides better visibility for the operator of the roadable aircraft 500.

The propeller 538 is positioned at the rear end of the fuselage 528. In certain embodiments, the rear end of the fuselage 528 is raised so a large propeller can be used. As shown, the propeller 538 has two blades, but it is to be understood that different numbers of blades are possible. Depending upon specific applications, the propeller may be powered by a rear or front engine. In certain embodiments, the propeller 538 may be detachable.

At the front end of the fuselage, there is the canard 537. Among other things, the canard 537 contains moveable components, and helps the roadable aircraft 500 to balance and provides stall resistance in flying.

FIG. 5B shows the roadable aircraft 500 in a configuration that is suitable for road travel. This diagram is merely an example, which should not unduly limit the scope of the claims. One of ordinary skill in the art would recognize many variations, alternatives, and modifications. As shown, the planes are rotated to become parallel to the length of the fuselage. Merely by way of an example, the joint 523 as shown in FIG. 5A, allows the top plane 521 to be lowered into the base 524. According to the present invention, other configurations for lowering the planes can be used. It is to be appreciated that by lowering the planes, the roadable aircraft 500 now has a lower center of gravity (i.e., a higher degree of stability) for road travel, less aerodynamic resistance, and less susceptibility to crosswind. In certain embodiments, the joint 523 does not move vertically, and the planes are not lowered for road travel.

In certain embodiments, the positions for the planes and the fuselage are carefully adjusted. One detail is the height of the wing and propeller and their relative position in road travel. In certain embodiments, the propeller is lowered when the planes are rotated for road travel. More over, the specific blade angle for the propeller may be adjusted. For example, with a three-blade propeller, by having one blade pointing directly to the ground, a minimal height for the propeller is achieved.

In a specific embodiment, the base 524 is provided for rotating the planes. In certain embodiments, the base 524 additionally includes room for lowering the joint 523. To convert the roadable aircraft 500 from air travel to land travel, the base 524 is rotated ninety degrees, causing the wings to be substantial parallel to the length of the fuselage. According to certain embodiments when the joint 523 is stored within the base 524 and the base 524 is rotated, the joint 523 and the base 524 are locked to the fuselage and each other. In a specific embodiment, a vibration-reduction mechanism is provided to ensure the mechanical strength and reliability of the locking mechanism. In certain embodiments, the directions for rotating planes are alternated for each trip to help maintain the balance and symmetry of the planes.

To convert the roadable aircraft 500 from road travel configuration to flying configuration, the planes 521 and 522 are rotated so that the planes are perpendicular to the length of the fuselage. The upper plane 521 is raised by raising joint 523 to obtain an airlift. Additional adjustments, such as adjusting the tail position, may also be made. In various embodiments, the conversions between road and air configurations are performed automatically. In a specific embodiment, the conversions between road and air configurations are performed manually.

Figure 6A:
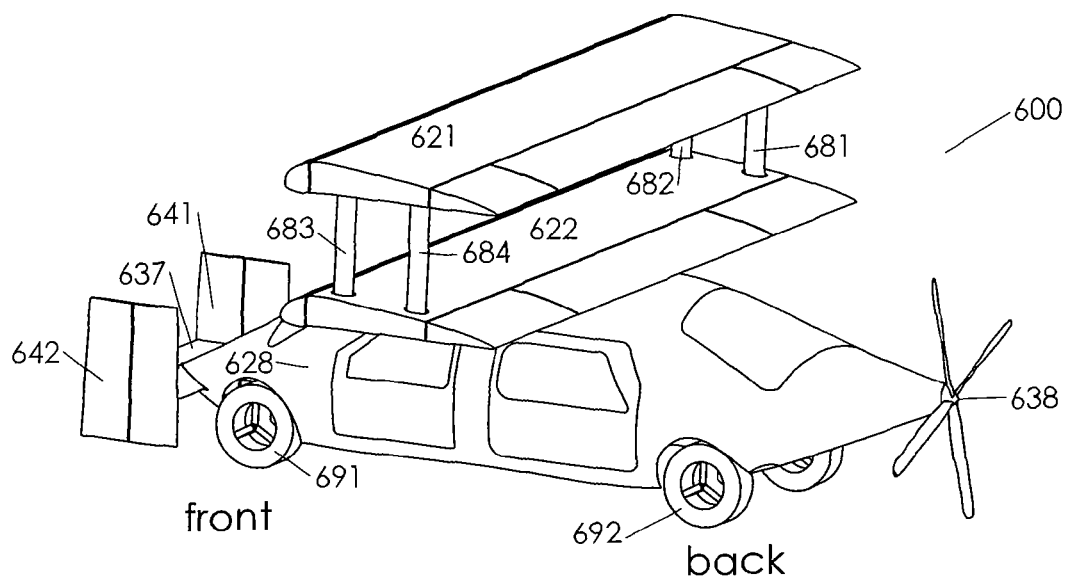
FIGS. 6A and 6B are diagrams illustrating a roadable aircraft according to yet another embodiment of the present invention.
Figure 6B:
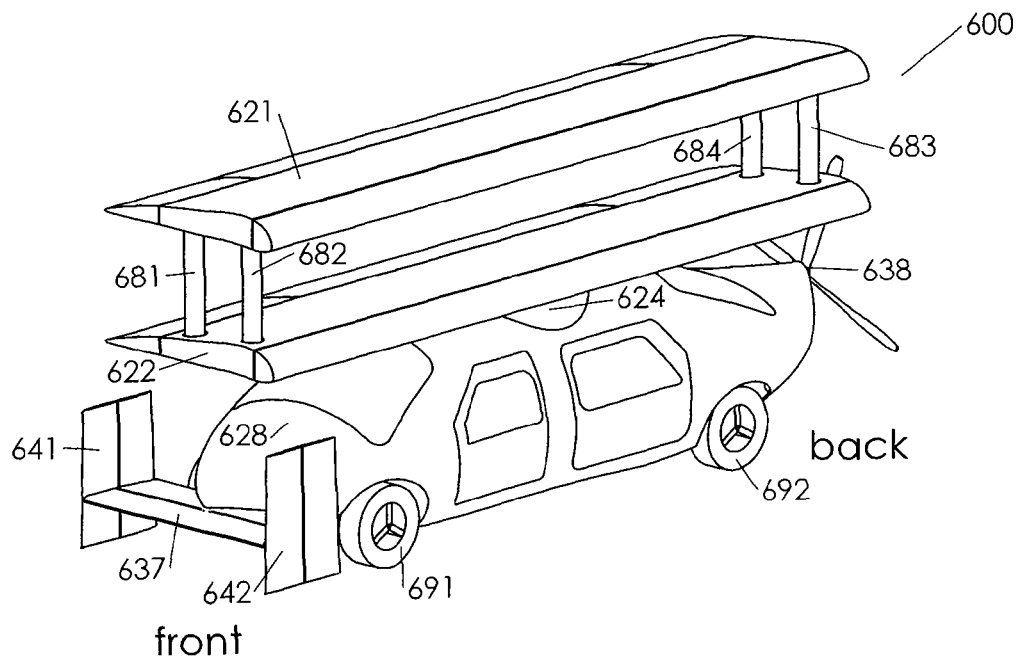

FIGS. 6A and 6B are diagrams illustrating a roadable aircraft according to an embodiment of the present invention. These diagrams merely provide an example, which should not unduly limit the scope of the claims. One of ordinary skill in the art would recognize many variations, alternatives, and modifications.

FIG. 6A shows a roadable aircraft 100 in a flying configuration, FIG. 6B a road travel configuration. The roadable aircraft 600 includes the following components:

1. a fuselage 628;
2. planes 621 and 622;
3. a base 624;
4. wing struts 681, 682, 683, 684;
5. wheels 691 and 692;
6. a propeller 638;
7. a canard 637; and
8. front rudders 641 and 642.

The fuselage 628 is aerodynamically shaped for both air and land travel. In the embodiment, the fuselage 628 has side doors for one or more passengers. Depending on specific applications, more or fewer doors may be implemented. Under the fuselage 628, there are wheels (e.g., wheels 691 and 692 as shown) that can be used for various purposes. For example, in addition to being used for moving on the road, the wheels are also used for taking off and landing operations when the roadable aircraft 600 is in the flying configuration. In certain applications, the wheels are retracted into the fuselage when flying to reduce air resistance. In the embodiment, the fuselage 628 is supported by four wheels during road travel. It is to be understood the roadable aircraft 600 may have different numbers of wheels. For example, the roadable aircraft may have two wheels (e.g., resembling a motorcycle), three wheels (e.g., one in the front and two in the back, or two in the front and one in the back), or other numbers of wheels.

The two planes 621 and 622 are coupled to each other via the wing struts 681, 682, 683, 684. It is to be appreciated that the multi-plane configuration according to the embodiments of the present invention is not limited to two planes. For example, configurations with three or more planes may be used. It is to be appreciated that, when compared to a conventional single plane design, the multi-plane design provides a significant increase of lift surface without increasing the projected area or width. According to an embodiment, both planes 621 and 622 are one-piece in construction. It is to be appreciated that the one-piece design provides better reliability and rigidity when compared to a foldable or extendable design. In addition, the one-piece design is relatively easy and less expensive to manufacture. Moreover, the one-piece design makes the integration of flight control element easy and natural. The number of wing struts could also be more or less than four.

The propellers 638 is positioned at the rear end of the fuselage 628. In certain embodiments, the rear end of the fuselage 628 is raised so a large propeller can be used. As shown, the propeller 638 has four blades, but it is to be understood that different numbers of blades are possible. Depending upon specific applications, the propeller may be powered by a rear or front engine. In certain embodiments, the propeller 638 may be detached.

At the front end of the fuselage, there is the canard 637. It may have moveable components for flight control. Among other things, the canard 637 helps the roadable aircraft 600 to balance and provides stall resistance in flying.

In addition to the canard 637, there are also rudders 641 and 642 located at the front end of the fuselage 628. As an example, the rudders provide stability during air travel, and reduce the need of vertical tail components. It is to be appreciated that the absence of the tail components at the back end of the fuselage provides better rear visibility for the operator of the roadable aircraft 600. It also reduces the aerodynamic interference between tail components and the propeller.

FIG. 6B shows the roadable aircraft 600 in a configuration that is suitable for road travel. This diagram is merely an example, which should not unduly limit the scope of the claims. One of ordinary skill in the art would recognize many variations, alternatives, and modifications. As shown, the planes are rotated to become parallel to the length of the fuselage. The four wing struts provide the mechanical support and connections between the lower and upper planes. They have low aerodynamic drags for both air and road travel. In certain embodiments, their heights are made adjustable, and the upper plane 621 can be lowered to lower the center of gravity (i.e., a higher degree of stability) for road travel.

In a specific embodiment, the base 624 is provided for rotating the planes. To convert the roadable aircraft 600 from air travel to land travel, the base 624 is rotated ninety degrees, causing the wings to be substantially parallel to the length of the fuselage. The base is then locked to the fuselage. In a specific embodiment, a vibration-reduction mechanism is provided to ensure the mechanical strength and reliability of the locking mechanism.

To convert the roadable aircraft 600 from road travel configuration to flying configuration, the planes 621 and 622 are rotated so that the planes are perpendicular to the length of the fuselage. Additional adjustments, such as adjusting the tail position, may also be made. In various embodiments, the conversions between road and air configurations are performed automatically. In a specific embodiment, the conversions between road and air configurations are performed manually.

Figure 7A:
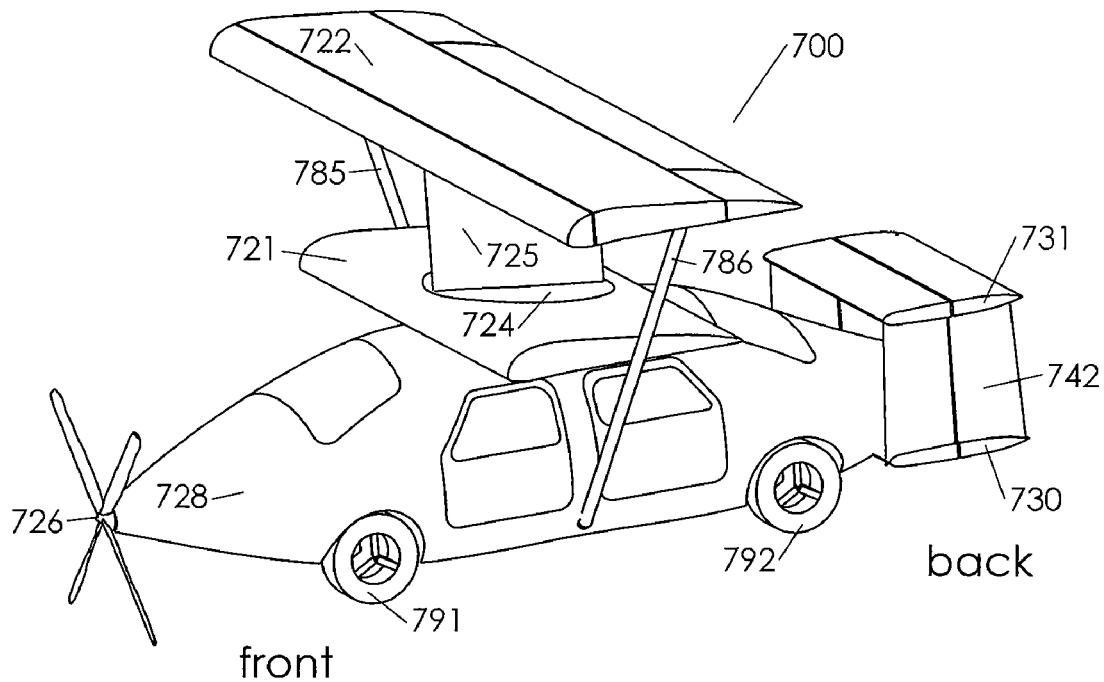
FIGS. 7A and 7B are diagrams illustrating a roadable aircraft according to yet another embodiment of the present invention.
Figure 7B:
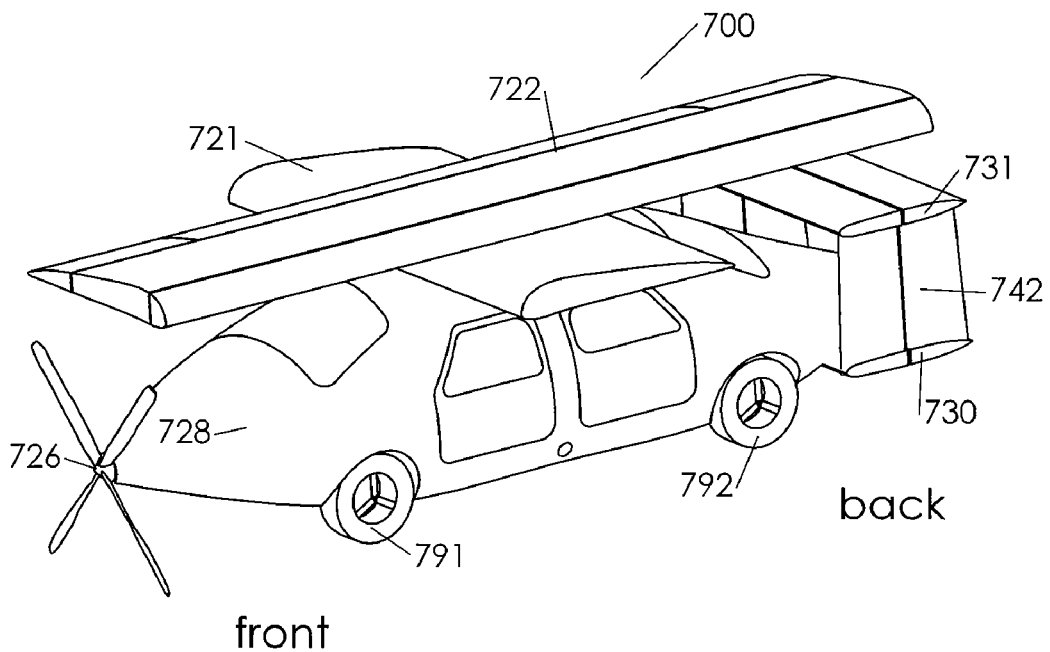

FIGS. 7A and 7B are diagrams illustrating a roadable aircraft according to an embodiment of the present invention. These diagrams merely provide an example, which should not unduly limit the scope of the claims. One of ordinary skill in the art would recognize many variations, alternatives, and modifications.

FIG. 7A shows a roadable aircraft 100 in a flying configuration, FIG. 7B a road travel configuration. The roadable aircraft 700 includes the following components:
1. a fuselage 728;
2. planes 721 and 722;
3. a base 724;
4. a joint 725;
5. wheels 791 and 792;
6. vertical tails 741 and 742;
7. horizontal tails 730 and 731;
8. a propeller 726; and
9. struts 785 and 786.

The fuselage 728 is aerodynamically shaped for both air and land travel. In the embodiment, the fuselage 728 has side doors for one or more passengers. Depending on specific applications, more or fewer doors may be implemented. Under the fuselage 728, there are wheels (e.g., wheels 791 and 792 as shown) that can be used for various purposes. For example, in addition to being used for moving on the road, the wheels are also used for taking off and landing operations when the roadable aircraft 700 is in the flying configuration. In certain applications, the wheels are retracted into the fuselage when flying to reduce air resistance. In the embodiment, the fuselage 728 is supported by four wheels during road travel. It is to be understood the roadable aircraft 700 may have different numbers of wheels. For example, the roadable aircraft may have two wheels (e.g., resembling a motorcycle), three wheels (e.g., one in the front and two in the back, or two in the front and one in the back), or other numbers of wheels.

The plane 722 is coupled to the plane 721 and the fuselage 728 via the joint 725 and the base 724. It is to be appreciated that the multi-plane configuration according to the embodiments of the present invention is not limited to two planes. For example, configurations with three or more planes may be used. It is to be appreciated that, when compared to a conventional single plane design, the multi-plane design provides a significant increase of lift surface without increasing the projected area or width. According to an embodiment, both planes 721 and 722 are one-piece in construction. It is to be appreciated that the one-piece design provides better reliability and rigidity when compared to a foldable or extendable design. In addition, the one-piece design is relatively easy and less expensive to manufacture. Moreover, the one-piece design makes the integration of flight control elements easy and natural.

During air travel, both planes 721 and 722 are aligned in a direction perpendicular to the length of the fuselage, so that an airlift can be obtained for flying. As shown in FIG. 7A, the planes 721 and 722 are substantially rectangular in shape. For example, the rectangular shape of the plane 722 allows a small width of the vehicle when the plane 722 is rotated ninety degrees for road travel. As can be seen from FIG. 7A planes 721 and 722 are different in lengths, with the lower plane 721 being shorter. The shorter length of the lower plane 721 provides the vehicle a shorter width when traveling on the road, since it is not rotated. It is to be understood that within the spirit of the present invention that other shapes are possible as well. For example, planes with taper and sweep design may also be implemented.

Two struts 785 and 786 connect the top plane 722 with fuselage 728. It provides more structural strength for the vehicle during flight. The number of struts could be more than two. Struts can also be used to connect the lower plane 721 with the fuselage 728, and the lower plane 721 with higher plane 722.

The propeller 726 is positioned at the front end of the fuselage. As shown, the propeller 726 has four blades, but it is to be understood that different numbers of blades are possible. Depending upon specific applications, other propeller configurations are possible. For example, the roadable aircraft 700 may instead have a rear propeller, or have both front and rear propellers. In certain embodiments, the propeller 726 may be detached.

At the rear end of the fuselage, there are two vertical tails 741 and 742, and two horizontal tails 730 and 731. It is to be appreciated that the multi-tail configuration according to the embodiments of the present invention is not limited to two tails. For example, configurations with three or more tails may be used, and the number of vertical tails may be different from that of horizontal tails. It is also to be appreciated that the multi-horizontal-tail designs provide additional control surface and better rear view clearance when compared with designs with single horizontal tails, while the multi-vertical-tail designs provide more control surface, lower tail height when compared with designs with single vertical tails.

FIG. 7B shows the roadable aircraft 700 in a configuration that is suitable for road travel. This diagram is merely an example, which should not unduly limit the scope of the claims. One of ordinary skill in the art would recognize many variations, alternatives, and modifications. As shown, the top plane 722 is lowered and rotated, and the struts 785 and 786 are removed. For example, the joint 725 as shown in FIG. 7A, allows the top plane 722 to be lowered into the base 724. According to the present invention, other configurations for lowering the plane 722 can be used. It is to be appreciated that by lowering the plane 722, the roadable aircraft 700 now has a lower center of gravity (i.e., a higher degree of stability) for road travel. It also reduces the effect of crosswind on the vehicle. In certain embodiments, the joint 725 does not move vertically, and the plane 722 is not lowered for road travel. The propeller 726 may be removed for road travel. This reduces the air resistance and aerodynamics torque, and enhances visual clearance for road travel.

In a specific embodiment, the base 724 is provided for rotating the plane 722. In certain embodiments, the base 724 additionally includes room for lowering the joint 725. To convert the roadable aircraft 700 from air travel to land travel, the base 724 is rotated ninety degrees, causing the top plane 722 to be substantial parallel to the length of the fuselage. According to certain embodiments when the joint 725 is stored within the base 724 and the base 724 is rotated, the joint 725 and the base 724 are locked to the fuselage and each other. In a specific embodiment, a vibration-reduction mechanism is provided to ensure the mechanical strength and reliability of the locking mechanism. In certain embodiments, the direction for rotating planes alternates for each trip to help maintain the balance and symmetry of the planes.

To convert the roadable aircraft 700 from road travel configuration to flying configuration, the top plane 722 is rotated so that both planes are perpendicular to the length of the fuselage. The top plane 722 is also raised to obtain an airlift. Additional adjustments, such as adjusting the tail position, may also be made. In various embodiments, the conversions between road and air configurations are performed automatically. In a specific embodiment, the conversions between road and air configurations are performed manually.

Many benefits are achieved by way of the present invention over conventional techniques. For example, the present technique provides a roadable aircraft that is reliable, convenient, and economical. Compared to conventional designs, a roadable aircraft according to the embodiment of the present invention is easy to manufacture, has high strength and light weight, and integrates conventional flight control elements. For example, an embodiment of the present invention is suitable for average consumers, and can be used to significantly shorten the time for medium to long range travel. Additionally, the embodiments of the present inventions are compatible with conventional technologies and existing laws without substantial modifications to conventional equipment and processes. Depending upon the embodiment, one or more of these benefits may be achieved.

It is also understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A vehicle capable of air and road travel, wherein the vehicle is adaptable to a flying configuration and a road configuration, the vehicle comprising:
    a fuselage having a front end, a rear end, a top side, a bottom side;
    a wing component having a plurality of wings including a first wing and a second wing, the first wing being characterized by a span direction and a chord direction, the first wing and the second wing being on top of the fuselage, and the first wing and second wing are overlapping vertically in both road and flying configurations, the first wing has a round leading edge and a trailing edge with an acute angle, the first wing remains perpendicular to a longitudinal vertical plane of the vehicle in the flying configuration, the second wing remains perpendicular to the longitudinal vertical plane of the vehicle in the flying configuration, at least one wing comprises one or more ailerons;
    a connecting component at an approximate center of the fuselage for coupling the wing component and the fuselage, the connecting component being able to pivot on the fuselage to accommodate a relative rotation between the first wing and the fuselage;
    a plurality of wheels coupled to the bottom side of the fuselage, the plurality of wheels including a front wheel and a rear wheel;
    a first propulsion component providing propelling force having a direction essentially parallel to a longitudinal axis of the fuselage;
    wherein:
        the span direction of the first wing is substantially perpendicular to the fuselage and is substantially parallel to the second wing in the flying configuration;
        the span direction of the first wing of the wing is substantially parallel to the longitudinal axis of the fuselage in the road configuration.
2. The vehicle of claim 1 wherein the first propulsion component is coupled to the fuselage.
3. The vehicle of claim 1 wherein at least one wing comprises one or more flaps.
4. The vehicle of claim 1 wherein the first wing is a top wing.
5. The vehicle of claim 1 wherein the connecting component is configured for accommodating a change of a vertical distance between the first wing and the second wing, the change of a vertical distance being associated with a change from the flying configuration to the road configuration or a change from the road configuration to the flying configuration.
6. The vehicle of claim 1 wherein the connecting component comprises:
    a base member on the top of the fuselage; and
    a joint member connecting to the base and the wings.
7. The vehicle of claim 1 wherein the first wing is an integral piece.
8. The vehicle of claim 1 wherein the propulsion component is positioned at the front end of the fuselage.
9. The vehicle of claim 1 wherein the propulsion component is positioned at the rear end of the fuselage.
10. The vehicle of claim 1 wherein the propulsion component comprises two blades.
11. The vehicle of claim 1 wherein the propulsion component is detachable from the vehicle.
12. The vehicle of claim 1 further comprising a second propulsion component providing propelling force having a direction essentially parallel to a longitudinal axis of the fuselage.
13. The vehicle of claim 1 further comprising a second propulsion component providing propelling force having a direction essentially parallel to a longitudinal axis of the fuselage, wherein:
    the first propulsion component is coupled to the front end of the fuselage;
    the second propulsion component is coupled to the rear end of the fuselage.
14. The vehicle of claim 1 further comprising a vertical stabilizer that is positioned at the front end of the fuselage.
15. The vehicle of claim 1 further comprising a canard that is positioned at the front end of the fuselage.
16. The vehicle of claim 1 further comprising a tail component.
17. The vehicle of claim 1 further comprising a tail component, the tail component including two vertical tails.
18. The vehicle of claim 1 further comprising a tail component, the tail component including two horizontal tails.
19. The vehicle of claim 1 further comprising a reflective mirror at the front end of the fuselage.
20. The vehicle of claim 1 further comprising a wind shield at the front end of the fuselage.
21. The vehicle of claim 1 wherein the width of the vehicle in the road configuration is being less than three meters.
22. The vehicle of claim 1 wherein the first wing is higher than the second wing by a predetermined distance.
23. The vehicle of claim 1 wherein the first wing comprises a plurality of rudders.
24. The vehicle of claim 1 wherein the wing component is characterized by a dihedral configuration.
25. The vehicle of claim 1 wherein the first wing is characterized by a substantially rectangular shape.
26. The vehicle of claim 1 wherein the first wing comprises a flight control component.
27. The vehicle of claim 1 wherein the first wing is longer in length than the second wing.
28. The vehicle of claim 1 further comprising at least one side door located on a side of the fuselage.
29. A vehicle for air and road travel, wherein the vehicle is adaptable to a flying configuration and a road configuration, the vehicle comprising:

a fuselage having a front end, a rear end, a top side, a bottom side, and a connecting component located on the top side;

a wing component being coupled to the connecting component, the wing component including a first wing and a second wing, the first and the second wings being coupled to each other via a joint member, the first wing having a span direction and a chord direction, the first wing and the second wing being on top of the fuselage, and the first wing and second wing are overlapping vertically in both road and flying configurations, the first wing has a round leading edge and a trailing edge with an acute angle, the first wing remains perpendicular to a longitudinal vertical plane of the vehicle in the flying configuration, the second wing remains perpendicular to the longitudinal vertical plane of the vehicle in the flying configuration, at least one wing comprises one or more ailerons;

a plurality of wheels coupled to the bottom side of the fuselage, the plurality of wheels including a front wheel and a rear wheel;

a front propulsion component being coupled to the fuselage, the front propulsion component including at least two blades, providing propelling force having a direction essentially parallel to a longitudinal axis of the fuselage;

a tail component including at least a vertical tail and at least a horizontal tail;

wherein:
the span direction of the first wing is substantially perpendicular to the fuselage in the flying configuration;
the span direction of the first wing is substantially parallel to the longitudinal axis of the fuselage in the road configuration.

30. The vehicle of claim 29 wherein the tail component further including a rear propulsion component providing propelling force having a direction essentially parallel to a longitudinal axis of the fuselage.

31. A vehicle for air and road travel, wherein the vehicle is adaptable to a flying configuration and a road configuration, the vehicle comprising:

a fuselage having a front end, a rear end, a top side, a bottom side, and a connecting component located on the top side;

a wing component being coupled to a base member, the wing component having a plurality of wings, including a first wing and a second wing, the first wing and the second wing being coupled to each other via a joint member, the first wing having a span direction and a chord direction, the first wing and the second wing being on top of the fuselage, and the first wing and second wing are overlapping vertically in both road and flying configurations, the first wing has a round leading edge and a trailing edge with an acute angle, the first wing remains perpendicular to a longitudinal vertical plane of the vehicle in the flying configuration, the second wing remains perpendicular to the longitudinal vertical plane of the vehicle in the flying configuration, at least one wing comprises one or more ailerons;

a plurality of wheels coupled to the bottom side of the fuselage, the plurality of wheels including a front wheel and a rear wheel;

a rear propulsion component being coupled to the rear end of the fuselage, the rear propulsion component including at least two blades, providing propelling force having a direction essentially parallel to a longitudinal axis of the fuselage;

a canard coupled to the front end of the fuselage;

wherein:
a span direction of the first wing is substantially perpendicular to the fuselage in the flying configuration;
the span direction of the first wing is substantially parallel to the longitudinal axis of the fuselage in the road configuration.

32. A method for converting a roadable aircraft for road travel, wherein the roadable aircraft is adaptable to a flying configuration and a road configuration, the roadable aircraft including a fuselage and a wing component, the wing component including a first wing and a second wing, the first wing having a span diction and a chord direction, the first wing and the second wing being on top of the fuselage, and the first wing and second wing are overlapping vertically in both road and flying configurations, the first wing has a round leading edge and a trailing edge with an acute angle, the first wing remains perpendicular to a longitudinal vertical plane of the vehicle in the flying configuration, the second wing remains perpendicular to the longitudinal vertical plane of the vehicle in the flying configuration, at least one wing comprises one or more ailerons, the method comprising:

pivoting the first wing so that the span direction of the first wing is substantially parallel to a longitudinal axis of the fuselage.

33. The method of claim 32 further comprising lowering the first wing.

34. The method of claim 32 further comprising lowering the second wing.

35. The method of claim 32 wherein the first wing is a top wing.

36. The method of claim 32 wherein the first wing is rotated in a first direction and a second wing is rotated in second direction, the first direction being opposite from the second direction.

37. The method of claim 32 wherein the roadable aircraft further including a propulsion component providing propelling force having a direction essentially parallel to a longitudinal axis of the fuselage.

38. A method for converting a flying car for flight, wherein the flying car is adaptable to a flying configuration and a road configuration, the flying car including a fuselage and a wing component, the wing component includes a first wing and a second wing, the first wing having a span direction and a chord direction, the first wing and the second wing being on top of the fuselage, and the first wing and second wing are overlapping vertically in both road and flying configurations, the first wing has a round leading edge and a trailing edge with an acute angle, the first wing remains perpendicular to a longitudinal vertical plane of the vehicle in the flying configuration, the second wing remains perpendicular to the longitudinal vertical plane of the vehicle in the flying configuration, at least one wing comprises one or more ailerons, the method comprising:

pivoting the first wing on the fuselage so that the span direction of the first wing is substantially perpendicular to a longitudinal axis of the fuselage.

39. The method of claim 38 further comprising raising at least one of the wing component.

40. The method of claim 38 wherein the first wing is a top wing.

41. The method of claim 38 wherein the flying car includes a propulsion component providing propelling force having a direction essentially parallel to a longitudinal axis of the fuselage.

42. A vehicle capable of air and road travel, wherein the vehicle is adaptable to a flying configuration and a road configuration, the vehicle comprising:
- a fuselage having a front end, a rear end, a top side, a bottom side;
- a wing component having a plurality of wings including a first wing and a second wing, the first wing and the second wing being characterized by a span direction and a chord direction, the first wing being essentially an integral piece, the first wing has a round leading edge and a trailing edge with an acute angle, the first wing remains perpendicular to a longitudinal vertical plane of the vehicle in the flying configuration, the second wing remains perpendicular to the longitudinal vertical plane of the vehicle in the flying configuration, at least one wing comprises one or more ailerons;
- a connecting component for coupling the wing component and the fuselage, the connecting component being able to pivot on the fuselage to accommodate a relative rotation between the first wing and the fuselage;
- a plurality of wheels coupled to the bottom side of the fuselage, the plurality of wheels including a front wheel and a rear wheel;
- a first propulsion component providing propelling force having a direction essentially parallel to a longitudinal axis of the fuselage;

wherein:
- the span directions of first wing and the second wing are substantially perpendicular to the fuselage in the flying configuration;
- the span directions of the first wing and the second wing are substantially parallel to a longitudinal axis of the fuselage in the road configuration;
- the connecting component is configured for accommodating a change of a vertical distance between the first plane and the second plane, the change of a vertical distance being associated with a change from the flying configuration to the road configuration or a change from the road configuration to the flying configuration.

43. A vehicle capable of air and road travel, wherein the vehicle is adaptable to a flying configuration and a road configuration, the vehicle comprising:
- a fuselage having a front end, a rear end, a top side, a bottom side;
- a wing component having a plurality of wings including a first wing and a second wing, the first wing being characterized by a span direction and a chord direction, the first wing overlaying the second wing, the first wing and the second wing being on top of the fuselage, the first wing has a round leading edge and a trailing edge with an acute angle, the first wing remains perpendicular to a longitudinal vertical plane of the vehicle in the flying configuration, the second wing remains perpendicular to the longitudinal vertical plane of the vehicle in the flying configuration, at least one wing comprises one or more ailerons;
- a connecting component for coupling the wing component and the fuselage, the connecting component being able to pivot on the fuselage to accommodate a relative rotation between the first wing and the fuselage;
- a plurality of wheels coupled to the bottom side of the fuselage, the plurality of wheels including a front wheel and a rear wheel;
- a first propulsion component providing propelling force having a direction essentially parallel to a longitudinal axis of the fuselage;

wherein:
- the span direction of the first wing is substantially perpendicular to the fuselage and is substantially parallel to the second wing in the flying configuration;
- the span direction of the first wing of the wing is substantially parallel to a longitudinal axis of the fuselage in the road configuration.

44. A vehicle capable of air and road travel, wherein the vehicle is adaptable to a flying configuration and a road configuration, the vehicle comprising:
- a fuselage having a front end, a rear end, a top side, a bottom side;
- a wing component having a plurality of wings including a first wing and a second wing, the first wing being characterized by a span direction and a chord direction, the first wing has a round leading edge and a trailing edge with an acute angle, the first wing remains perpendicular to a longitudinal vertical plane of the vehicle in the flying configuration, the second wing remains perpendicular to the longitudinal vertical plane of the vehicle in the flying configuration, at least one wing comprises one or more ailerons;
- a connecting component for coupling the wing component and the fuselage, the connecting component being able to pivot at an approximate center of the first wing on the fuselage to accommodate a relative rotation between the first wing and the fuselage;
- a plurality of wheels coupled to the bottom side of the fuselage, the plurality of wheels including a front wheel and a rear wheel;
- a first propulsion component providing propelling force having a direction essentially parallel to a longitudinal axis of the fuselage;

wherein:
- the span direction of the first wing is substantially perpendicular to the fuselage and is substantially parallel to the second wing in the flying configuration;
- the span direction of the first wing of the wing is substantially parallel to a longitudinal axis of the fuselage in the road configuration.

45. The vehicle of claim 1 wherein at least one wing comprises one or more slats.

* * * * *